United States Patent Office 2,996,396
Patented Aug. 15, 1961

2,996,396
THIXOTROPIC OIL VEHICLE
Herbert M. Schroeder, Williamsville, Robert L. Terrill, Snyder, and Hans M. Hauge, Buffalo, N.Y., assignors to Spencer Kellogg and Sons, Inc., Buffalo, N.Y.
No Drawing. Filed Dec. 11, 1957, Ser. No. 701,961
6 Claims. (Cl. 106—252)

The present invention relates to thixotropic vehicles suitable for use in the manufacture of paints, varnishes or inks and to a method of manufacturing such vehicles.

Heretofore in order to improve the application properties such as brushing characteristics and flowability it has been proposed to add to the paint or varnish vehicle materials acting as puffing agents as, for instance, metallic soaps such as aluminum stearate. Certain modifications of the characteristics of the oil vehicle were also obtained by liming the oil but in general such products merely tend to provide the vehicle with a heavier and false body without providing true thixotropic properties thereto.

More recently it has been proposed to employ polyamide resins as agents for providing thixotropic properties to drying oils. Such resins were incorporated into the vehicle solids by reacting the resin with the vehicle for a considerable period of time at a temperature of 400° to 500° F.

It is an object of the present invention to prepare drying oil vehicles having thixotropic characteristics.

It is a further object of the present invention to produce drying oil vehicles of desired high viscosity without the necessity of employing high polymerization temperatures.

It is therefore an ancillary object of the invention to prepare drying oil vehicles suitable for the preparation of films and protective coatings, which vehicles possess improved characteristics with respect to suspension, grinding, brushing sagging and color uniformity over both primed and unprimed surfaces.

It is a further object of the invention therefore to provide a drying oil vehicle capable of producing a paint possessing greater suitability and uniformity and with less tendency of pigment to settle or cake in the paint can.

In accordance with the principles of the present invention very desirable thixotropic characteristics can be induced in drying and semi-drying oils by incorporating in the oil at moderate temperatures a relatively small proportion of ethylene diamine. In general, the amount of ethylene diamine based on the weight of the oil is from about 0.1% to 5% or more, preferred quantities in the ultimate oil vehicle being within the range of 0.5% to 1.5% by weight. In general, the ethylene diamine may be incorporated in the oil at temperatures in the range of about 200° F. to 450° F. At lower temperatures the reaction time required is considerably longer and preferred temperature ranges of the reaction are from about 240° F. to 350° F.

The desired thixotropic characteristics may be induced either in bodied oils or in unbodied oils and the reaction may be performed upon polymerized oils or upon copolymerized oils.

Thixotropic characteristics by the reaction with ethylene diamine may be induced in drying oils such as linseed oil, perilla oil, rapeseed oil, safflower oil, tung oil, oiticica oil, as well as semi-drying oils such as soybean oil and cottonseed oil. Due to the relatively greater importance of linseed oil and soybean oil, the examples herein will be restricted to the use of those oils in order to show the principles of the invention, it being understood however that the invention is not restricted thereto.

The phenomenon of thixotropy is exhibited when a gel becomes fluid when shaken or when subjected to continued stress. Definitions and means for expressing thixotropy in terms of stated units related to viscosity may be found in Von Fisher-Bobalek, "Organic Protective Coatings," Reinhold Publishing Company, 1953, page 56; Stewart's Scientific Dictionary, 4th edition, page 695.

The general method of measuring thixotropy is to measure the viscosity of the material by means of a standard viscosimeter. In the examples given hereinafter a Brookfield viscosimeter was employed to determine the torque required to turn a spindle at a given rate of speed. These torques may be expressed in terms of viscosity and subsequently the normal ratios of the viscosities are used to express the degree of thixotropy.

In the measurement of the thixotropic characteristics of the products made by the present invention normally the smallest Brookfield spindle could be employed. The torque of the samples was determined at 25° C. at 6, 12, 30 and 60 r.p.m. The sample was then thoroughly mixed and the torque again immediately measured at decreasing rates, namely 60, 30, 12 and 6 r.p.m. The torque measurements are converted to thixotropic units in poises and the order of thixotropy is then expressed as the simple ratio of the viscosity of the original sample at 6 r.p.m. divided by the viscosity of the sample determined by the second determination at 60 r.p.m.

Example 1

200 grams of bodied linseed oil Z8 (590 poises) is heated to 240° F. 2 grams of ethylene diamine is added slowly at this temperature. After the addition of the ethylene diamine, the temperature is maintained for an additional 4 hours. This product is reduced to 60% non-volatile with mineral spirits. After standing at room temperature for a period of 1–20 hours the thixotropy is determined.

The Brookfield viscosity of the product was determined as follows: 6 r.p.m., 700 poises; 12 r.p.m., 360 poises; 30 r.p.m., 180 poises; 60 r.p.m., 95 poises. After thorough mixing the following viscosities are obtained: 60 r.p.m., 49 poises; 30 r.p.m., 72 poises; 12 r.p.m., 125 poises; and 6 r.p.m., 210 poises. The viscosity of the untreated sample when reduced to 60% non-volatile had a viscosity of 4 poises. The torque measurements are always made in this same sequence. The order of thixotropy can be expressed as the simple ratio of the viscosity of the original 6 r.p.m. measurement over the second 60 r.p.m., which in this case would be 700/49.

Example 2

500 grams of alkali refined soybean oil is heated to 125° C. with protection with inert gas. 5 grams of ethylene diamine is added over a 30 minute period. After another 30 minutes the temperature is raised to 160° C.

The index of thixotropy as defined above on this product at 100% non-volatile is 50/16. It will be noted that not only is this product thixotropic it also has a much higher viscosity.

In Example 1, thixotropic characteristics were added to a typical bodied drying oil, while in Example 2 thixotropic characteristics were induced in an unbodied oil, in this instance, the semi-drying oil, soybean oil. Similar results are capable of achievement with any of the oils falling within these classes and the reaction is therefore applicable to those oils containing ethenoid groups so characteristic of linolenic acid and linoleic acid and elaeostearic acid.

The reaction is suitable for polymerized oils as indicated above and is therefore, of course, suitable for the special class of polymerized oils thought of as being copolymerized, as for instance, the well-known copolymerized product obtained by reaction with a benzenoid vinyl compound, for instance vinyltoluene. The following example is given to illustrate the reaction with a typical copolymerized oil:

*Example 3*

1000 grams of a vinyltoluene soybean oil copolymer (35:65) having a viscosity of Z1 at 60% non volatile is heated to 125° C. 6 grams of ethylene diamine is added slowly and the temperature is maintained at 125° C. for ½ hour. The vehicle is then heated to 160° C. and this temperature is maintained for another 6 hours. The vehicle when cooled to room temperature is a semi-solid non-flowing material unless it is first agitated. This vehicle when reduced to 50% non-volatile, had the following index of thixotropy, 560/46. With 0.5% ethylene diamine under the same conditions, a negligible thixotropy of 5/4.5 is measured.

Drying and semi-drying oils may have thixotropic properties added thereto by heating with ethylenediamine to produce a reacted end product having 0.15% to 5% or more by weight based on the oil of the ethylenediamine as may homopolymerized and copolymerized oil where the copolymer is with a benzenoid vinyl compound. The benzenoid vinyl compound may therefore comprise up to about 80 parts by weight of the completed vehicle.

*Example 4*

In a reaction vessel there is heated under conventional copolymerization conditions, 250 grams of dehydrated castor oil and 660 grams of mineral spirits. To this solution is added 750 grams of vinyl toluene and organic peroxide catalyst. To 400 grams of the final copolymer there was added 2 grams of ethylene diamine at 240° F. over a period of ½ hour and the mixture held at 240° F. for an additional ½ hour whereafter the temperature was raised to 320° F. and held at temperature for 4 hours.

The thixotropic characteristics were determined on the end product after 16 hours, as follows:

| R.P.M. | Increasing | Decreasing |
|---|---|---|
| 6 | 37.0 | 14.0 |
| 12 | 30.5 | 14.0 |
| 30 | 25.0 | 14.0 |
| 60 | 20.0 | 14.3 |

From the above it will be noticed that thixotropic characteristics may be easily and readily imparted to drying oils, semi-drying oils and paint vehicles generally, at relatively low temperatures, by reacting such vehicle at such low temperature with ethylene diamine with the production of an oil vehicle which may be used to prepare paints having excellent brushing characteristics, good color uniformity and a vehicle which will produce a film having no sagging characteristics.

What is claimed is:

1. The method of imparting thixotropic characteristics to an oil which comprises heating an oil selected from the group consisting of unbodied drying oils, unbodied semi-drying oils, bodied drying oils, bodied semi-drying oils, a liquid copolymer of a vegetable drying oil with a benzenoid vinyl monomer selected from the group consisting of vinyl benzene and vinyl toluene, and a liquid copolymer of a vegetable semi-drying oil with a benzenoid vinyl monomer selected from the group consisting of vinyl benzene and vinyl toluene in the range of 200° F. to 450° F. with from about 0.1% to 5% of ethylenediamine based on the weight of the oil, for from about 0.5 hour to about 6 hours until the oil has acquired thixotropic characteristics greater than about 5/4.5.

2. An oil vehicle having thixotropic characteristics prepared by heating the oil selected from the group consisting of unbodied drying oils, unbodied semi-drying oils, bodied drying oils, bodied semi-drying oils, a liquid copolymer of a vegetable drying oil with a benzenoid vinyl monomer selected from the group consisting of vinyl benzene and vinyl toluene, and a liquid copolymer of a vegetable semi-drying oil with a benzenoid vinyl monomer selected from the group consisting of vinyl benzene and vinyl toluene in the range of 200° F. to 450° F. with from about 0.1% to 5% of ethylenediamine based on the weight of the oil, for from about 0.5 hour to about 6 hours until the oil has acquired thixotropic characteristics greater than about 5/4.5.

3. An oil vehicle having thixotropic characteristics prepared by heating bodied linseed oil in the range of 200° F. to 450° F. with from about 0.1% to 5% of ethylenediamine based on the weight of the oil for from about 0.5 hour to about 6 hours until the oil has acquired thixotropic characteristics greater than about 5/4.5.

4. An oil vehicle having thixotropic characteristics prepared by heating refined soybean oil in the range of 200° F. to 450° F. with from about 0.1% to 5% of ethylenediamine based on the weight of the oil for from about 0.5 hour to about 6 hours until the oil has acquired thixotropic characteristics greater than about 5/4.5.

5. An oil vehicle having thixotropic characteristics prepared by heating a liquid copolymer of soybean oil and vinyltoluene in the range of 200° F. to 450° F. with from about 0.1% to 5% of ethylenediamine based on the weight of the oil for from about 0.5 hour to about 6 hours until the oil has acquired thixotropic characteristics greater than about 5/4.5.

6. An oil vehicle having thixotropic characteristics prepared by heating a copolymer of castor oil and vinyl toluene in the range of 200° F. to 450° F. with from about 0.1% to 5% of ethylenediamine based on the weight of the oil for from about 0.5 hour to about 6 hours until the oil has acquired thixotropic characteristics greater than about 5/4.5.

References Cited in the file of this patent

UNITED STATES PATENTS

| 2,291,396 | Lieber | July 28, 1942 |
| 2,379,413 | Bradley | July 3, 1945 |
| 2,387,201 | Weiner | Oct. 16, 1945 |
| 2,414,427 | Zurcher | Jan. 14, 1947 |
| 2,738,281 | Chenicek et al. | Mar. 13, 1956 |
| 2,861,048 | Wright et al. | Nov. 18, 1958 |

FOREIGN PATENTS

| 726,609 | France | June 1, 1932 |

OTHER REFERENCES

Fieser et al.: "Organic Chemistry," 2nd edition (1950), p. 417.